US009521861B2

(12) United States Patent
Hoffman et al.

(10) Patent No.: US 9,521,861 B2
(45) Date of Patent: Dec. 20, 2016

(54) FRUIT CHUNKING AND SPEAR FORMING APPARATUS

(71) Applicants: Michael A. Hoffman, Pueblo, CO (US); David C. Bullock, Pueblo, CO (US); Christopher G. Theis, Pueblo, CO (US); Christopher A. Hildreth, Pueblo, CO (US); Tim Vaughan, Pueblo, CO (US); John P. Keeton, Pueblo, CO (US); Dwight Blickensderfer, Pueblo, CO (US)

(72) Inventors: Michael A. Hoffman, Pueblo, CO (US); David C. Bullock, Pueblo, CO (US); Christopher G. Theis, Pueblo, CO (US); Christopher A. Hildreth, Pueblo, CO (US); Tim Vaughan, Pueblo, CO (US); John P. Keeton, Pueblo, CO (US); Dwight Blickensderfer, Pueblo, CO (US)

(73) Assignee: Atlas Pacific Engineering Co., Pueblo, CO (US)

( * ) Notice: Subject to any disclaimer, the term of this patent is extended or adjusted under 35 U.S.C. 154(b) by 0 days.

(21) Appl. No.: 14/757,371

(22) Filed: Dec. 22, 2015

(65) Prior Publication Data

US 2016/0113320 A1    Apr. 28, 2016

Related U.S. Application Data

(62) Division of application No. 13/987,739, filed on Aug. 26, 2013, now Pat. No. 9,277,765.

(Continued)

(51) Int. Cl.
*A23N 7/08* (2006.01)
*A23N 7/00* (2006.01)
(Continued)

(52) U.S. Cl.
CPC ............ *A23N 7/00* (2013.01); *A23L 19/00* (2016.08); *A23L 19/03* (2016.08); *A23N 4/24* (2013.01);
(Continued)

(58) Field of Classification Search
CPC ............ A23N 7/08; A23N 7/00; A23N 7/02; A23N 15/04; A23L 1/2123; A23L 1/212; B65D 3/26; B65D 3/24; B65D 1/43; B65D 1/45; B65D 9/00; B65D 7/2628
See application file for complete search history.

(56) References Cited

U.S. PATENT DOCUMENTS 2,261,150 A * 11/1941 Ewald ............... A23N 4/14
83/107
3,753,397 A *  8/1973 Shrewsbury ........ A23N 4/18
99/491

(Continued)

FOREIGN PATENT DOCUMENTS

EP         1949805     *  7/2008
WO      WO 88/07333     * 10/1988
WO    WO 2008033741    *  3/2008

*Primary Examiner* — Anthony Weier
(74) *Attorney, Agent, or Firm* — Bruce H Johnsonbaugh

(57) ABSTRACT

A system for automatically forming chunks and spears at high speed from unpeeled fruit items is provided. The fruit is sliced into unpeeled wedges. The unpeeled wedges are conveyed into a plurality of staggered transverse chunking blades, wherein the flesh, but not the peel, is cut sequentially from the center of each wedge outwardly, flattening each wedge. A peel removal knife is located to sever the peel of each wedge from the center outwardly after the transverse chunk cutting blades have cut the flesh. Spears may be formed by deleting some of the transverse chunking blades.

5 Claims, 16 Drawing Sheets

Related U.S. Application Data

(60) Provisional application No. 61/743,478, filed on Sep. 5, 2012.

(51) Int. Cl.

| | |
|---|---|
| *B26D 3/26* | (2006.01) |
| *B26D 7/26* | (2006.01) |
| *B26D 9/00* | (2006.01) |
| *A23N 7/02* | (2006.01) |
| *A23N 15/04* | (2006.01) |
| *B26D 1/03* | (2006.01) |
| *A23N 4/24* | (2006.01) |
| *B26D 1/43* | (2006.01) |
| *B26D 1/45* | (2006.01) |
| *B26D 3/24* | (2006.01) |

(52) U.S. Cl.
CPC ............... *A23N 7/002* (2013.01); *A23N 7/02* (2013.01); *A23N 7/08* (2013.01); *A23N 15/04* (2013.01); *B26D 1/03* (2013.01); *B26D 3/26* (2013.01); *B26D 7/2628* (2013.01); *B26D 9/00* (2013.01); *A23V 2002/00* (2013.01); *B26D 1/43* (2013.01); *B26D 1/45* (2013.01); *B26D 3/24* (2013.01)

(56) References Cited

U.S. PATENT DOCUMENTS

| | | | | |
|---|---|---|---|---|
| 4,175,690 | A * | 11/1979 | Bova | A23G 9/42 227/76 |
| 5,598,773 | A * | 2/1997 | Hoffseth | A23N 7/00 99/585 |
| 9,277,765 | B2 * | 3/2016 | Hoffman | A23N 7/08 |

* cited by examiner

FRUIT CHUNKING AND SPEAR FORMING APPARATUS

CROSS REFERENCE TO RELATED APPLICATION

This application claims the benefit of and priority from U.S. provisional application Ser. No. 61/743,478 filed Sep. 5, 2012, and U.S. provisional application Ser. No. 61/853,260 filed Apr. 1, 2013. This application is a divisional of and claims priority from application Ser. No. 13/987,739 filed Aug. 26, 2013.

BACKGROUND

The present invention pertains to a fruit chunking and spear forming machine that is designed to automatically produce chunks and/or spears of fruit from fresh, unpeeled whole fruit. The invention applies to the production of melon, cantaloupe and pineapple chunks and/or spears, but the same technology can be applied to other types of fruit. As used herein, the word "spears" means an elongated piece of fruit; the cross-section can be rectangular or a variety of shapes.

The worldwide demand for fruit chunks and spears continues to rise, even as the cost of fresh fruit increases. Fruit chunks and spears are being sold in an increasing array of outlets such as restaurants, markets and fast food establishments. There is an increasing demand for fruit processing equipment that is efficient, reliable and cost effective. The prior art teaches the use of either manual techniques or the requirement for multiple machines to produce chunks and/or spears. Providing a single machine capable of chunking and/or forming spears from a variety of fresh fruits would help meet the burgeoning demand for these products.

The current methods of producing fruit chunks and/or spears from whole fresh fruit include hand cutting, mechanized peeling between centers and mechanized scooping. The present invention improves upon hand cutting by increasing throughput and reducing repetitive motion injuries. It improves upon prior art mechanized peeling by improving the quality of the finished product and it improves upon mechanized scooping by improving yield.

The prior art includes U.S. Pat. No. 3,831,469 which teaches a system of peeling, slicing and chunking pineapples. The peeling is performed separately by a different machine. As described below, it would be advantageous to provide a system that could peel, core, sever seed cells, slice and chunk a wide variety of fruit with a single machine. The present invention does all these steps with a single machine, and with a minimum amount of waste. The present invention is not limited to the processing of pineapples. The invention described below includes rind or peel removal, core and seed cell removal and cutting into chunks and/or spears, all automated within one machine.

BRIEF SUMMARY OF INVENTION

The present invention solves the aforementioned problems by providing a single machine capable of processing a wide variety of unpeeled and unprocessed fruit into chunks and/or spears. The single machine performs all necessary steps while minimizing waste.

A novel feature of the preferred embodiment is a blade assembly that cuts wedges into chunks and simultaneously removes the peel. The preferred blade assembly transversely cuts the wedges through the center first, and successive cuts are made outwardly toward the upturned ends of each wedge. As the successive transverse cuts are made, the wedge is flattened. The resulting chunks are thereby caused to have a maximized "square" shape, i.e. a maximized rectangular prism shape. Simultaneously with the transverse cuts, a peel removal knife severs the peel from the wedge. The peel severing starts at the longitudinal center of each wedge, and moves outwardly as the transverse cuts flatten each wedge. The result is minimized waste in removing the peel from each wedge.

Another aspect of the preferred embodiment is an improved seed celler mechanism that reduces waste. As fruit enters the machine the axis extending from the stem through the fruit center is measured. This dimension is used to position a seed ceiling knife along the axis at the most efficient seed ceiling location. In addition, the seed cell knife has an expandable curved blade which is expanded to the estimated radial size of the seed cell, based on the size of the fruit's axis. This feature also minimizes waste.

A primary object of the invention is to provide a single, high speed, automatic machine capable of receiving fresh, unprocessed fruit and coring, seed ceiling, slicing, peeling and chunking the fruit while minimizing waste.

A further object is to provide a blade assembly that, in a preferred embodiment, flattens fruit wedges as chunking cuts are made in order to produce chunks having a maximized "square" or rectangular prism shape.

Another object is to provide a blade assembly capable of peeling and chunking fruit wedges simultaneously.

Yet another object is to provide a high speed, automatic fruit chunking machine that measures the size of each piece of fruit and adjusts the positioning and size of a seed ceiling knife to minimize waste during the seed cell removal.

A further object is to provide a seed ceiling knife with an adjustable, curved blade capable of efficiently severing seed cells of different sizes.

A further object is to provide a fruit chunking machine that is also capable of simultaneously producing both chunks and spears from each separate item of fruit.

Other objects and advantages will become apparent from the following description and drawings.

DETAILED DESCRIPTION OF THE DRAWINGS

Figure 1:
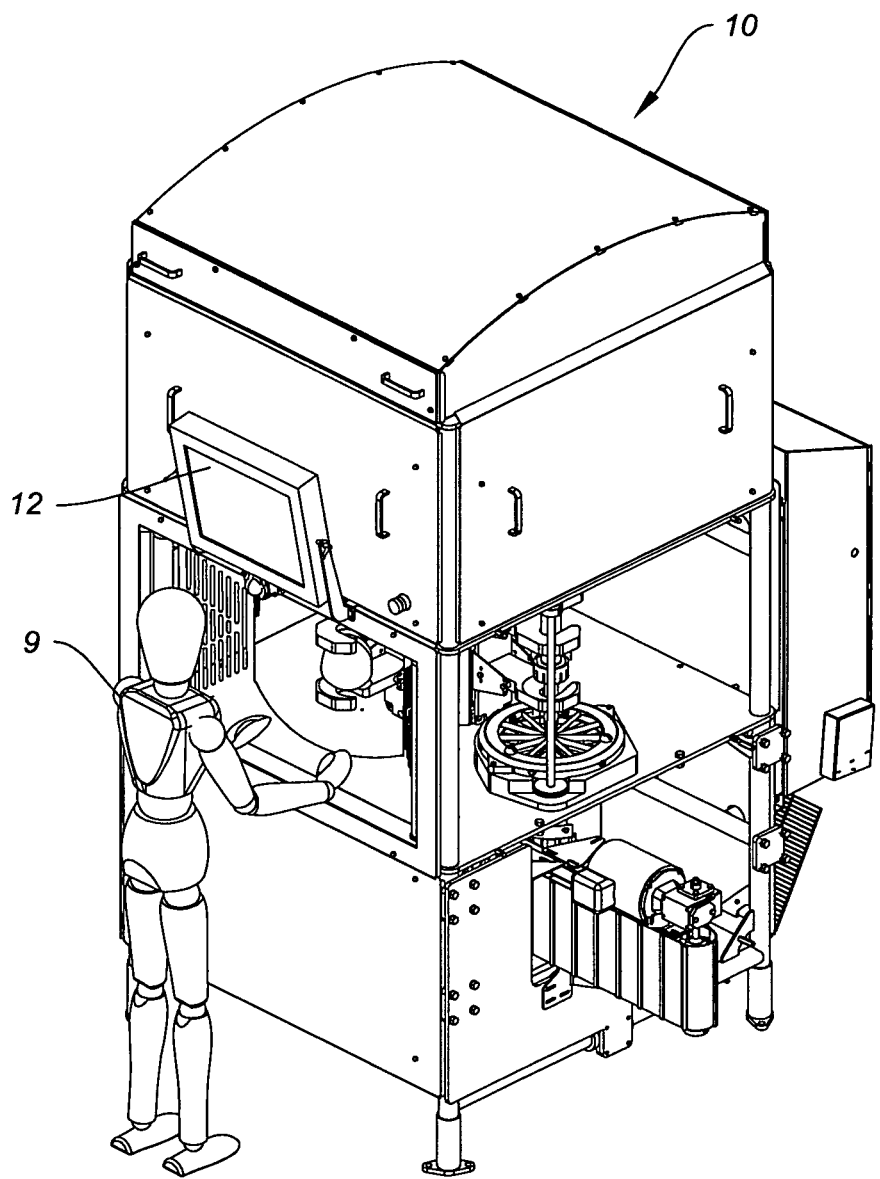
FIG. 1 is an isometric view of an embodiment of the invention in which fruit is manually fed into the apparatus.

As shown in FIG. 1, the fruit chunking and spear forming machine 10 is a high speed, automatic machine capable of receiving raw, unprocessed and unpeeled fruit and processing the fruit into chunks and spears. All required steps are performed by the single machine 10. The embodiment shown in FIG. 1 is hand fed by operator 9. Machine 10 is capable of being fed by automatic feeders (not shown). Machine 10 is capable of processing speeds of 15 fruit items per minute.

Figure 2:
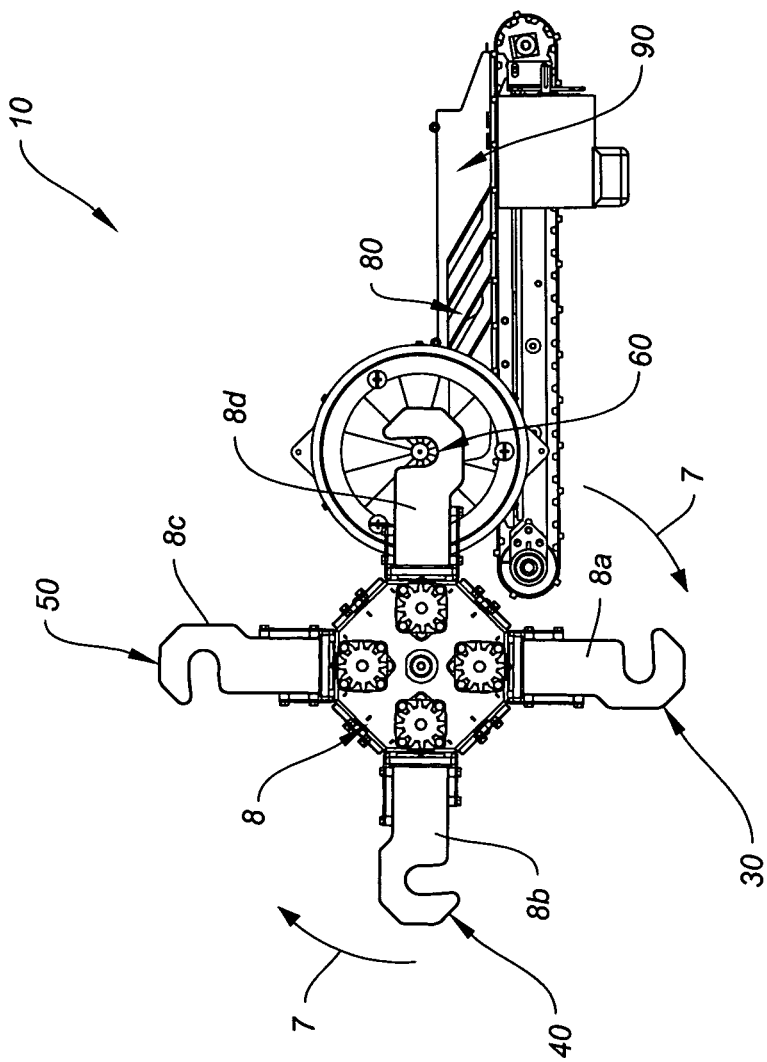
FIG. 2 is a top view of the major components of the apparatus, with the frame not shown for clarity.

FIG. 2 is a top view of machine 10 with the frame not shown. A turret 8 has four arms 8a-8d; turret 8 rotates clockwise as shown by arrows 7. Turret 8 moves fruit (not shown in FIG. 2) through four stations: a fruit feed station 30, a core removal station 40, a seed cell removal station 50 and a wedge slicing station 60. At wedge slicing station 60, the fruit is sliced and discharged onto a conveyor 80 and is conveyed through a peel removal and chunking blade assembly 90.

Figure 3:
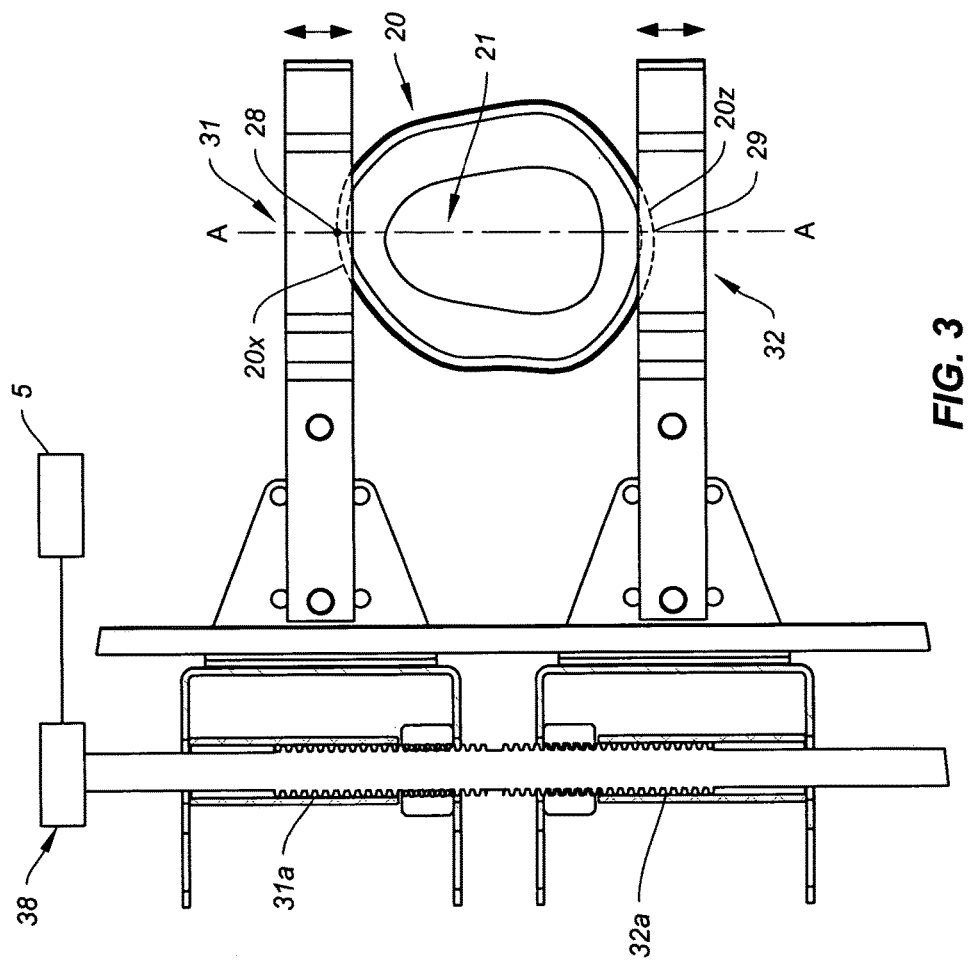
FIG. 3 is a cross section of a piece of fruit gripped by servo actuated feed cups.

As shown in FIGS. 1 and 3, operator 9 places fruit item 20 between upper feed cup 31 and lower feed cup 32, which hold the fruit at the top 20x and bottom 20z. Operating parameters are entered on screen 12 above the operator's head.

Feedback from a single servo motor 38 provides controller 5 with the size of the individual fruit size being processed. There is only one servo motor driving the lead screws. Lead screws 31a and 32a are opposite hand (RH and LH) screws on the same shaft. Servo motor 38 drives one direction to open the cups and the other direction to close them. This sizing information is utilized in further processing, including the adjustment of seed ceiling knife blade 51 shown in FIGS. 5A and 5B.

As shown in FIG. 3, fruit 20 has an axis A-A extending from the stem 28 at the top end 20x and extending through the center of the seed pocket 21 to the bottom 20z. Feed cups 31 and 32 measure the length of this axis A-A for each fruit item. A safety interlock light curtain is located at the loading station. This device will not allow the machine to operate while the light curtain is broken. The cups that grip the fruit are actuated by servo motor driven lead screws 31a and 32a, which are driven by servo motor 38. The position of the lead screws is measured by the machine controller 5 to determine the height of each fruit (i.e. by measuring the length of the fruit axis A-A) that is loaded into the machine. This information is used in subsequent operations to optimize yield.

Figure 4:
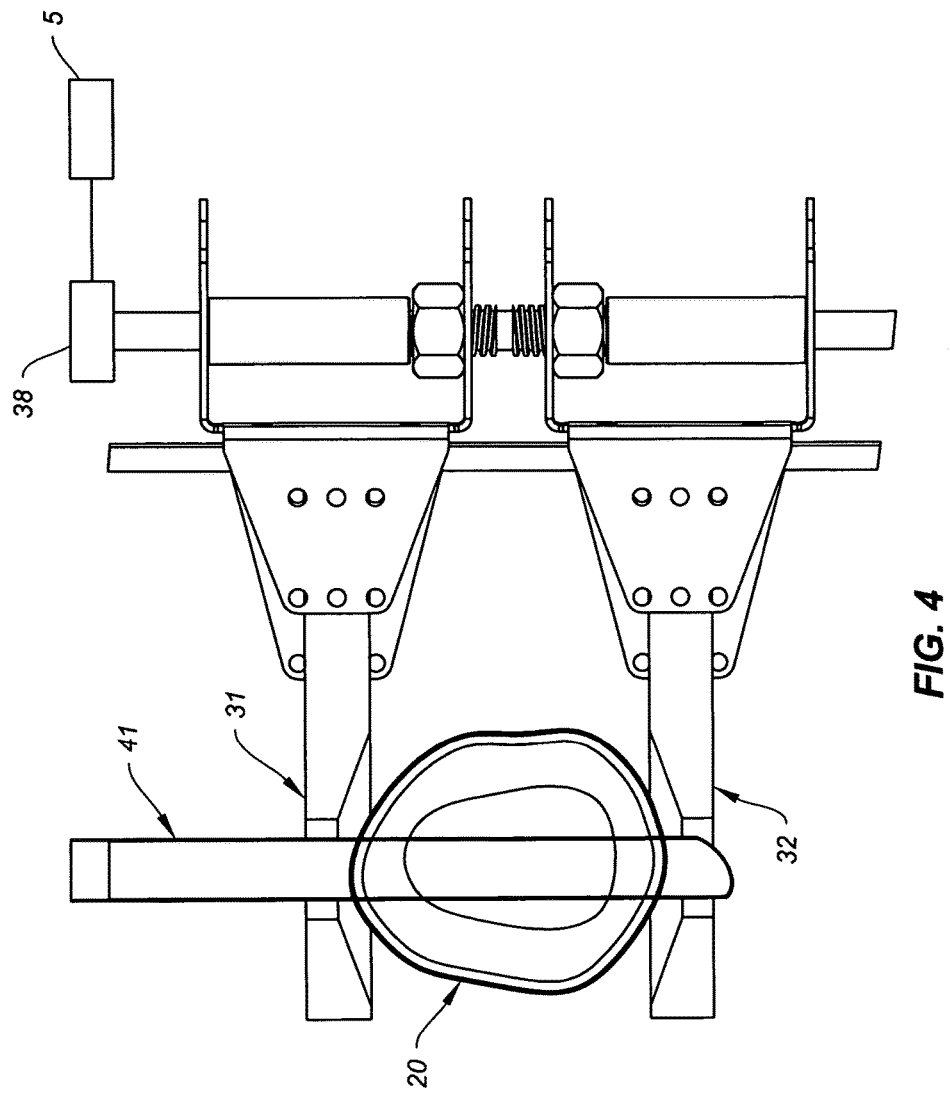
FIG. 4 is a sectional view of a piece of fruit being cored.

Referring to FIG. 4, once the operator's hands are out of the feeding envelope and the machine is ready to advance, the machine turret rotates 90°, which moves the fruit into the core removal station 40 (FIG. 2). At the core removal station 40, shown in FIG. 4, the fruit is cored with a rotating core tube 41. A rotating core tube uses significantly less force to pierce the fruit compared with a non-rotating tube and to remove the fibrous material in the center of the fruit.

Figure 5A:
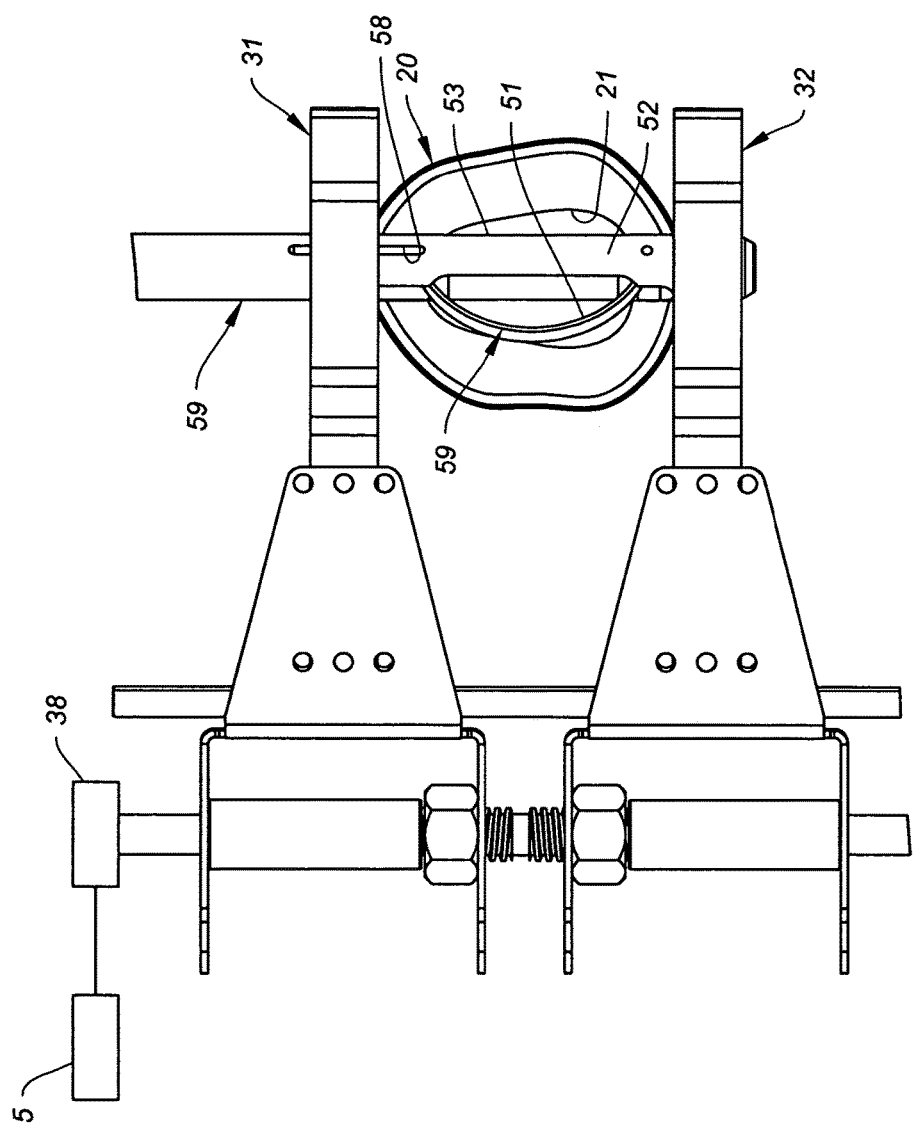
FIG. 5A is a sectional view of a piece of fruit showing the seed cell knife removing the seed cell.

As shown in FIG. 5A after the fruit is cored, it is rotated 90° by the turret to the seed removal station 50. FIG. 5A shows a cross section of a single piece of fruit 20 as the seed pocket 21 is removed by knife 59. The fruit remains stationary, while a seed cell tube 52 is lowered into the hole that was created by the coring operation. The seed cell tube 52 is lowered to the optimum vertical position because the machine controller 5 uses the fruit height data (or length and size of fruit axis A-A) collected at the feed station to determine the size of the fruit and calculates the location of the cell seed pocket 21. The seed cell knife blade 51 is moved to the proper location, the blade 51 is extended and the seed cell tube 52 is rotated within the fruit to cut the seed cell material from the fruit. The amount that the flexible seed cell knife blade 51 is extended is determined by the controller using the fruit size information from the feed station to minimize waste. The seed cell blade 51 can be configured as a loop, which is shown in this application, or it could be configured as a series of horizontal blades or as a whisk type device.

Figure 5B:
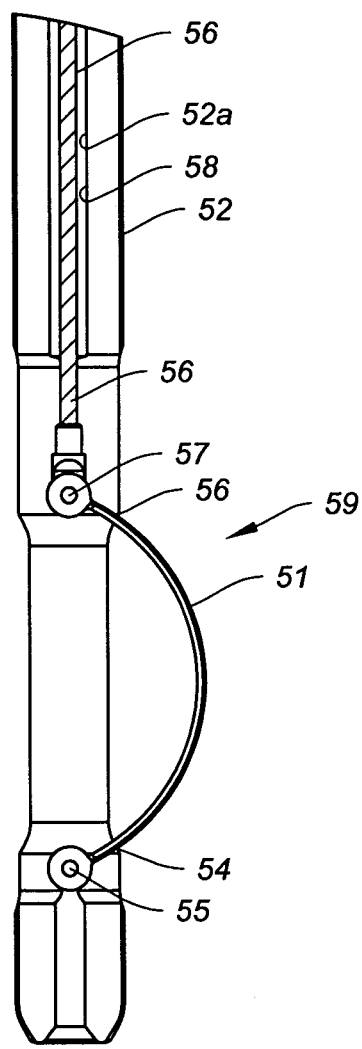
FIG. 5B is an elevational view of the adjustable seed cell knife.

Seed cell removal knife 59 has an adjustable blade 51 that has an expanded position shown in FIG. 5B wherein it forms an arc relative to support tube 52. Blade 51 has a lower end 54 connected to pin 55 and upper end 56 connected to pin 57. Pin 57 slides in slot 58 to cause blade 51 to retract when pin 57 is pulled upwardly to the top of slot 58. The positioning of pin 57 in slot 58 for any single fruit item is determined by feedback from servo motor 38 (FIG. 3) to controller 5 as described above. That feedback is used to both position the seed celler knife relative to cups 31, 32 (FIG. 2) and to determine how far the adjustable blade 51 should be extended radially to remove the seed cell while minimizing the amount of usable flesh being removed by blade 51.

FIG. 5B is an elevational view of seed cell removal knife 59. Adjustable blade 51 is shown in its fully extended position, wherein movable pin 57 connected to the upper end of blade 51 has been moved to its lowermost position in slot 58 by drive rod 56. As noted above, drive rod 56 is positioned in slot 58 in response to feedback from servo motor 38, wherein the feedback is relative to the size of the individual item (i.e. the length of axis A-A) of fruit being processed. Drive rod 56 is moved upwardly in FIG. 5B to retract blade 51 to a position adjacent interior wall 52a of support tube 52 to facilitate entry and removal of knife 50 from a fruit item.

Figure 6:
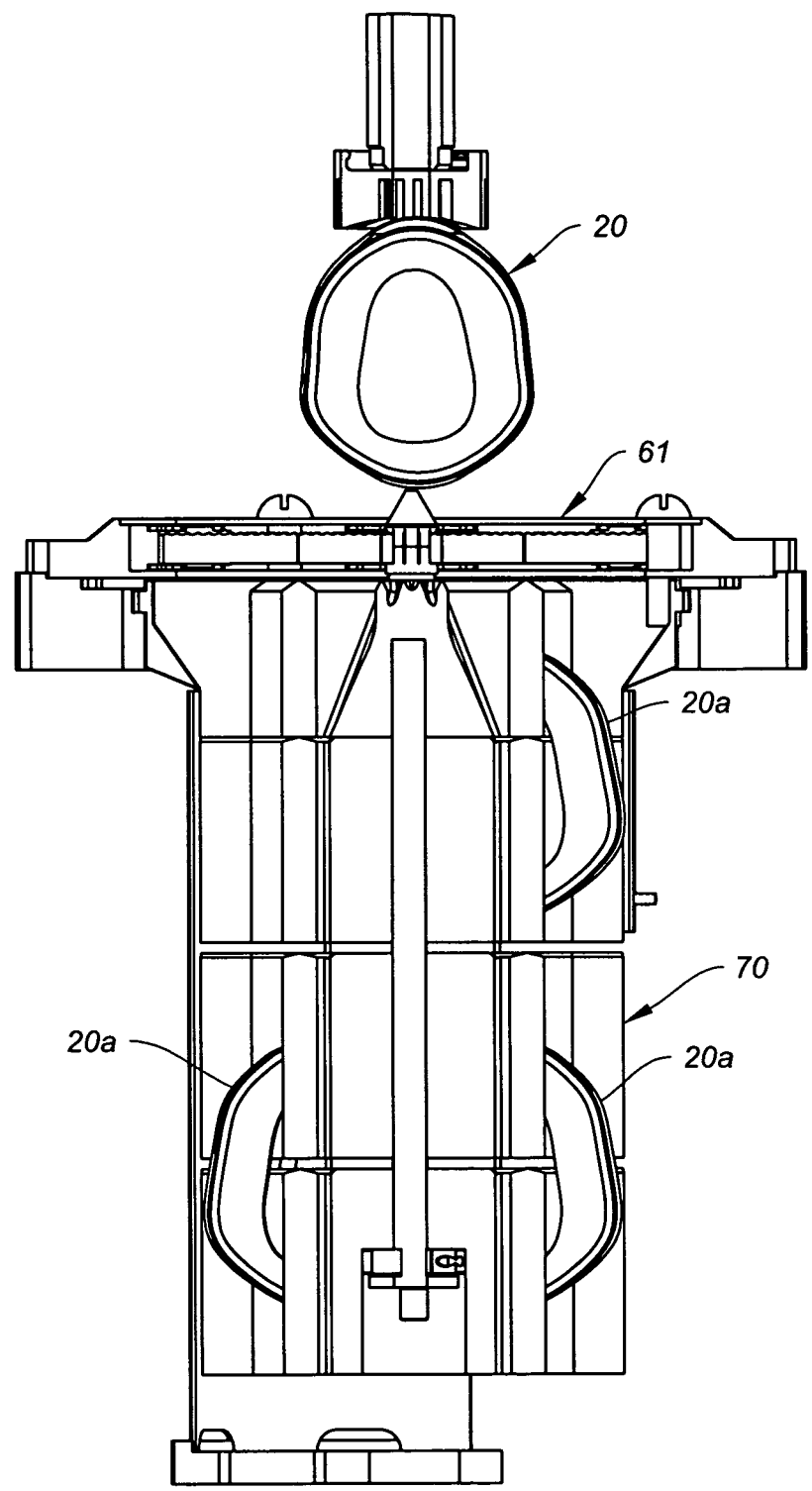
FIG. 6 is a sectional view of fruit entering the top of the slice assembly, and fruit wedges being discharged downwardly.

FIG. 6 shows a cross section of one item of unpeeled fruit 20 as it is being pushed into the wedge slicing knife assembly 61. The fruit 20 is supported along its axis A-A (FIG. 3) as it is pushed into slicing knife assembly 61, which includes a plurality of radially extending blades. Fruit wedge slices 20a are shown below the wedge slicing knife assembly 61 as they are dropped into the wedge collection cup assembly 70.

Figure 7:
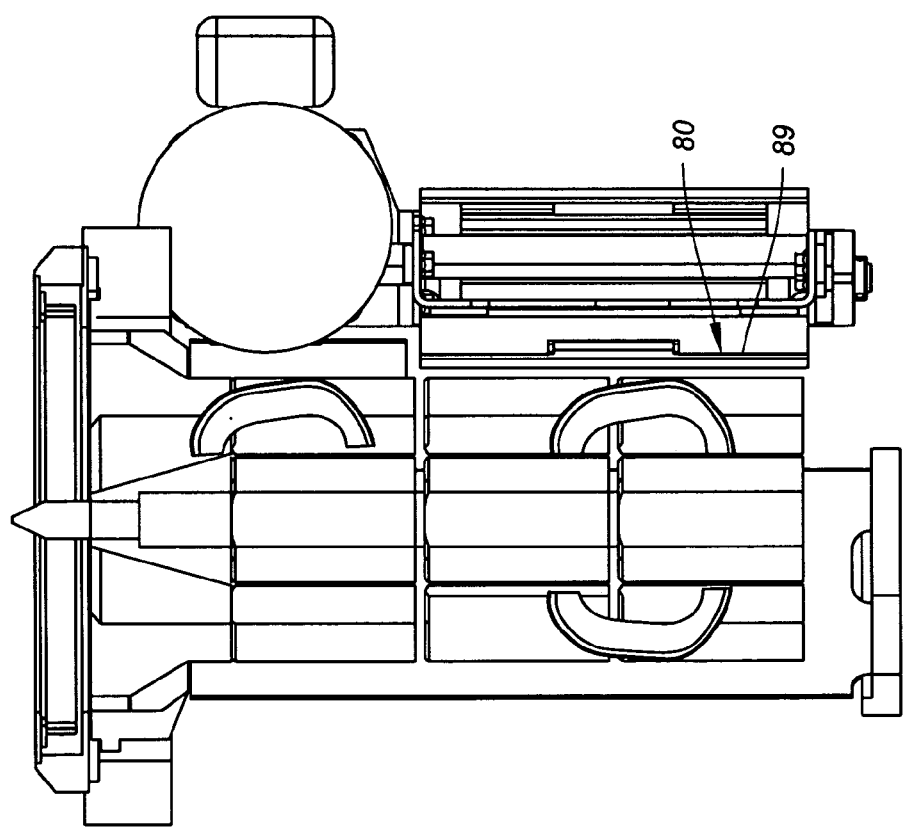
FIG. 7 is an elevational view showing fruit wedges being transferred to a wedge transport conveyor.

FIG. 7 shows an end view of the fruit wedge slices as they are singulated and conveyed away from the wedge collection cup by a flighted wedge transport conveyor 80. Conveyor 80 has a vertically oriented bed 89.

Figure 15A:
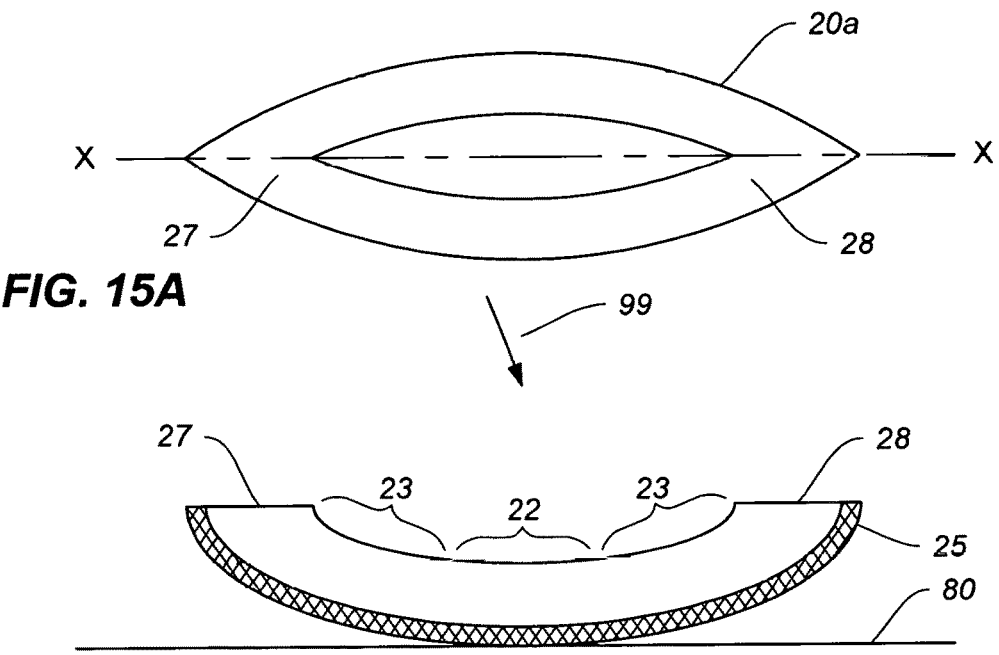
FIGS. 15A-15C are top, side and sectional views of a single wedge.
Figure 15B:
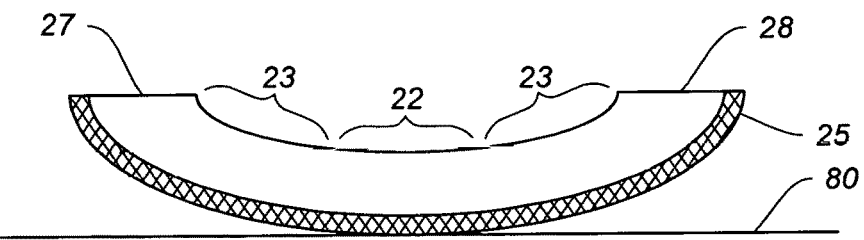
Figure 15C:
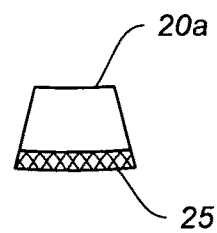

FIGS. 15A-15C are top, side and sectional views of a fruit wedge 20a. Each wedge is unpeeled and has a longitudinal axis X-X and is generally "C shaped" as shown in FIG. 15B. Each wedge 20a, is placed on conveyor 80 so that its longitudinal axis is perpendicular to the direction of travel 99 (FIG. 15a and FIG. 9) of conveyor 80. The upturned ends 27 and 28 of wedge 20a extend outwardly from conveyor 80. Wedge 20a has a center region 22, regions 23 that lie further away from the longitudinal center 22, and upturned ends 27 and 28. The peel is shown as 25. Longitudinal axis X-X extends between the two upturned ends 27 and 28.

Figure 8:
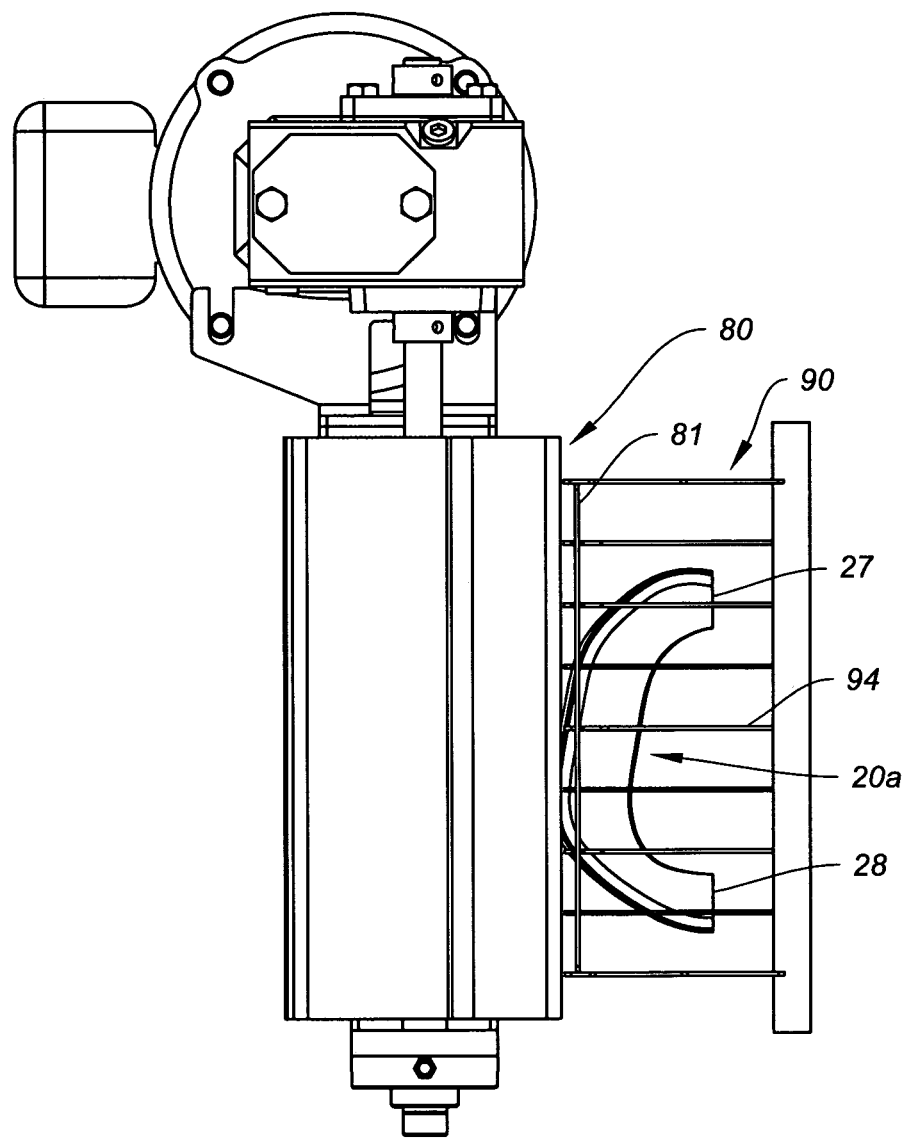
FIG. 8 is an elevational view showing a fruit wedge being conveyed into the chunking and peeling blade assembly.
Figure 9:
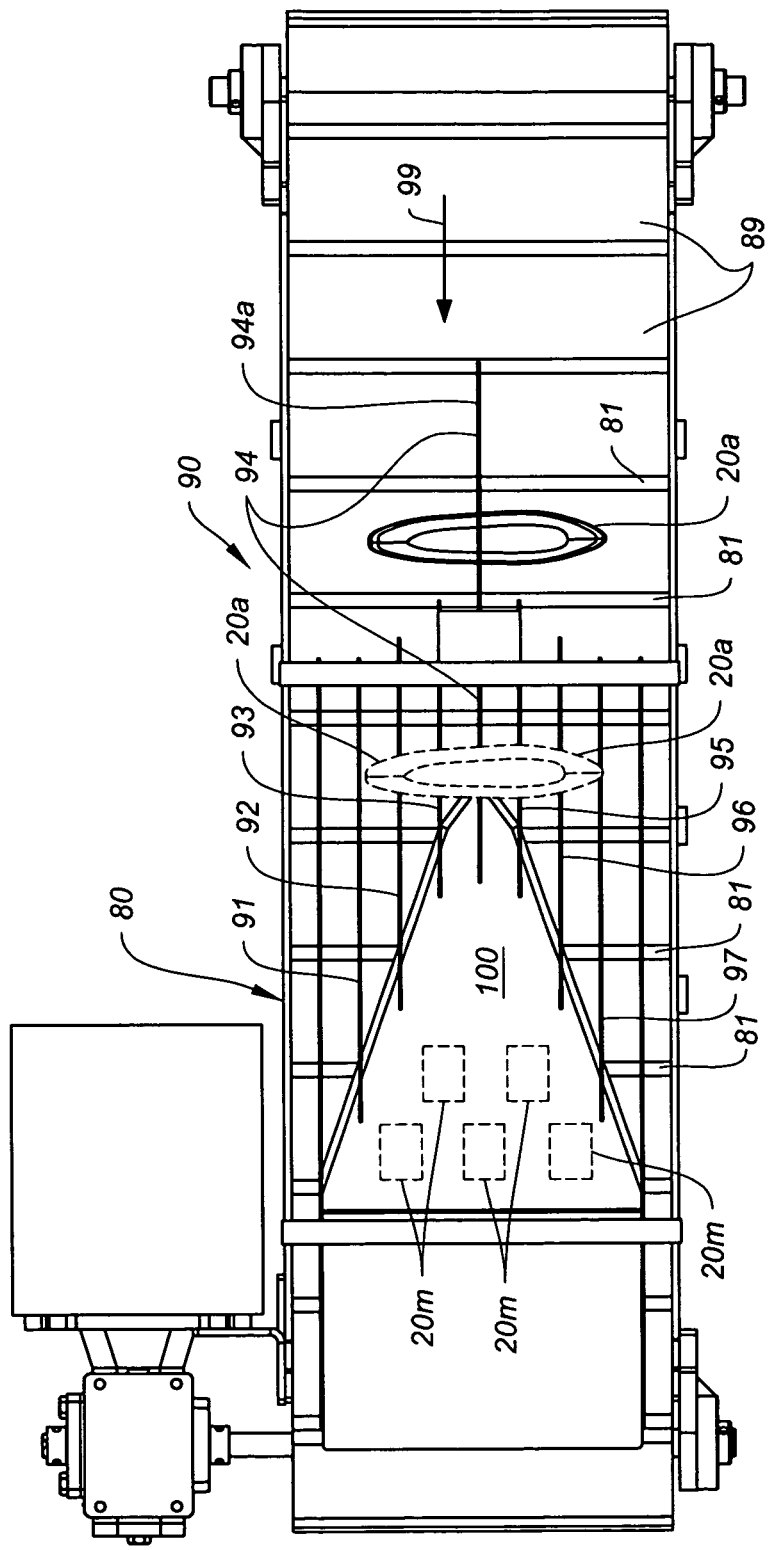
FIG. 9 is a side elevational view of one embodiment of the chunking and peeling blade assembly.

FIG. 8 shows an end view on the line FIG. 8-FIG. 8 of FIG. 9 and shows a wedge slice 20a being conveyed by the wedge transport conveyor 80 into the chunking and peeling blade assembly 90 shown in FIG. 9. The wedge 20a is oriented vertically, i.e. its longitudinal axis X-X extends vertically.

FIG. 9 shows a side elevational view of one embodiment of the chunking and peeling blade assembly 90 wherein chunks are cut and the peel is simultaneously removed. Assembly 90 includes seven separate, stationary and elongated chunking blades 91-97. Center blade 94 is the first blade through which wedge 20a passes. The tip 94a of blade 94 pierces wedge 20a as wedge 20a contacts conveyor 80 and supports wedge 20a as it is conveyed through the assembly 90. Wedge 20a tends to flatten somewhat after passing through center blade 94. Blade 94 does not sever the peel 25 of wedge 20a. After being conveyed through center chunking blade 94, wedge 20a flattens somewhat and then is conveyed through secondary chunking blades 93 and 95 simultaneously. Wedge 20a flattens further and is conveyed through chunking blades 92 and 96 simultaneously after passing through blades 93 and 95. The flattening of wedge 20a continues from its center to regions that lie further away from the longitudinal center of each wedge to its ends 27, 28 as wedge 20a is conveyed through the staggered array of stationary chunking blades 91-97 from center blade 94 to outermost blades 91 and 97. This "flattening" is shown further in FIGS. 13A-13E described below. Various numbers of chunking blades may be utilized. Various degrees of staggering along the direction of travel of wedges 20a on conveyor 80 may also be used between chunking blades with the goal of flattening each wedge as much as possible before the wedge enters the next chunking blade, and before each region of the wedge moves into the peeling blade or knife 100.

After wedge 20a is conveyed into chunking blades 91-97 a sufficient distance to create chunks still attached to peel 25, wedge 20a is conveyed into stationary peel removal knife 100. Wedge 20a is shown in phantom in FIG. 9 as it is about to be conveyed into peel removal knife 100. Knife 100 is shaped and positioned to sever the peel 25 from the longitudinal center 22 (FIG. 15B) of wedge 20a first, and then to sever the peel from regions 23 further away from the center of wedge 20a. In the embodiment shown in FIG. 6, peel removal knife 100 lies in a vertical plane.

As wedge 20a is conveyed through chunking blades 91-97 and through peel removal knife 100, wedge 20a is flattened in several sequential steps from its center outwardly, has had the chunks of flesh severed from peel 25, and the separated chunks 20m are then ready for market. The chunks 20m have a maximized rectangular prism shape, since the chunks are formed as each wedge is flattened.

Wedge transport conveyor 80 has a vertically extending surface 89 and has low profile flights such as flight 81 shown in FIGS. 8 and 9. Flight 81 has seven recesses which pass beneath the seven chunking blades 91-97.

Flight 81 (and all flights of wedge transport conveyor 80) has a sufficiently low profile to pass alongside the stationary peel removal knife 100 without contacting knife 100. Peel removal knife 100 is preferably a solid, large surface blade, but could also be a "wire" or small surface blade that severs the peel 25 after the wedge 20a has been flattened by passing through the spaced apart or staggered chunking blades 91-97.

Figure 10:
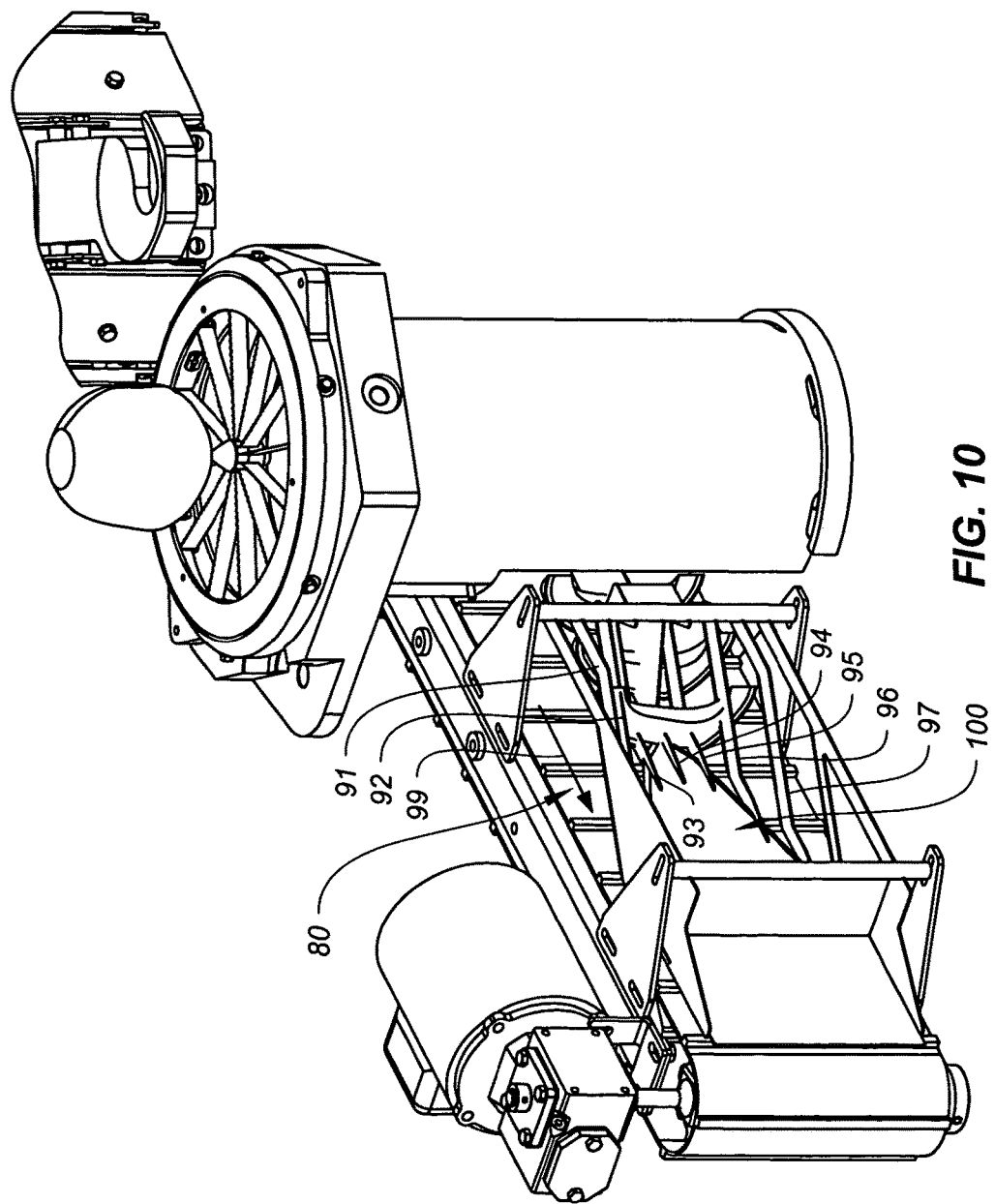
FIG. 10 is a perspective view from the discharge end of the chunking and peeling blade assembly of FIGS. 8 and 9, looking upstream as a wedge is being conveyed through the blades.

FIG. 10 is a perspective view showing the wedge transport conveyor 80 moving in the direction of arrows 99 across chunking blades 91-97 and peel removal knife 100. Knife 100 is a solid, flat and smooth surface blade in this embodiment.

Figure 11:
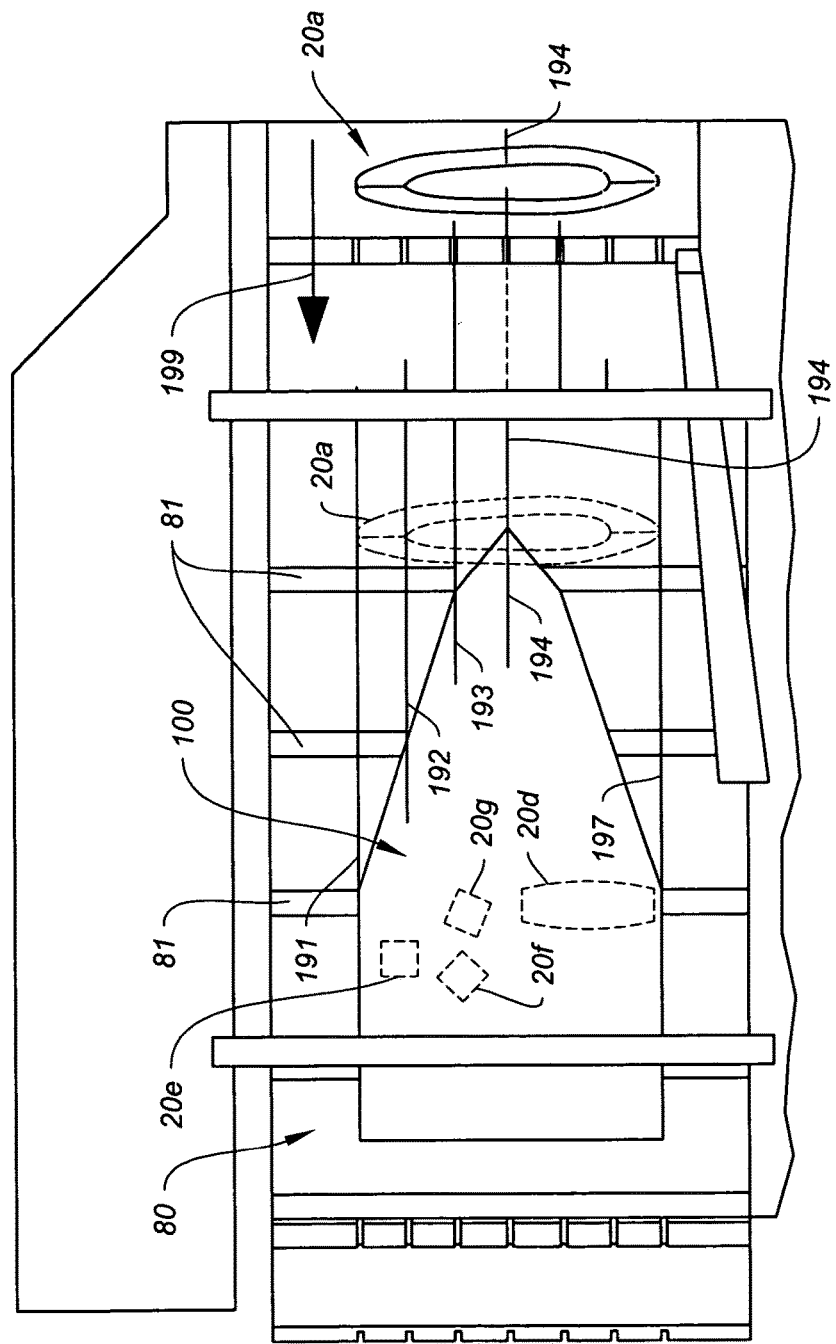
FIG. 11 is a side elevational view of an alternative embodiment of a chunking, spear forming and peeling blade assembly, wherein spears are being formed simultaneously with chunks.

FIG. 11 is a plan view of a second embodiment for producing "spears" together with producing chunks. Wedge 20a is conveyed to the left in FIG. 11 as shown by arrow 199. FIG. 11 shows a variation wherein the blades 95 and 96 shown in FIG. 8 are removed. Blades 191, 192, 192, 194 and 197 correspond to the blades 91, 92, 93, 94 and 97 of FIG. 8. The spacing of blades 194 and 197 in FIG. 11 will produce an elongated spear 20d along with chunks 20e, 20f and 20g. Longer spears can easily be produced by removing blade 194 and/or blades 193, 192 and 191. Chunks and spears can be produced simultaneously from each item of fruit.

Figure 12:
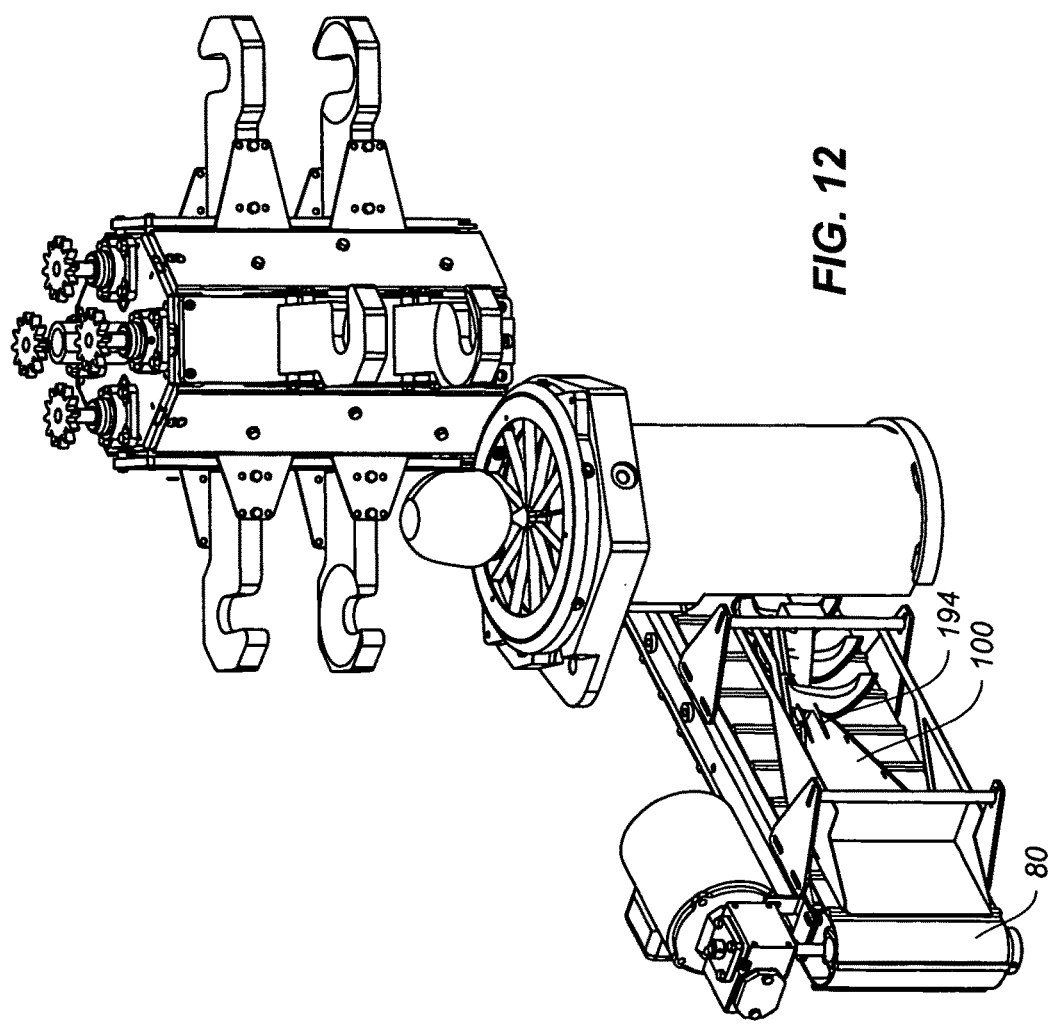
FIG. 12 is a perspective view from the discharge end of the chunking, spear forming and peeling blade assembly of FIG. 11, looking upstream as a wedge is being conveyed through the blades.

FIG. 12 is a perspective view of the blade assembly shown in FIG. 11.

Spears of various lengths can be produced together with chunks in this embodiment.

The embodiment shown in FIGS. 8-10 produces chunks that are approximately cubic or rectangular prisms in shape. The embodiment shown in FIGS. 11-12 produces chunks and spears that are approximately rectangular prisms in shape.

The embodiment shown in FIGS. 11-12 uses the same peel removal blade 100 shown in FIGS. 9 and 10 to remove the peel.

Figure 13A:
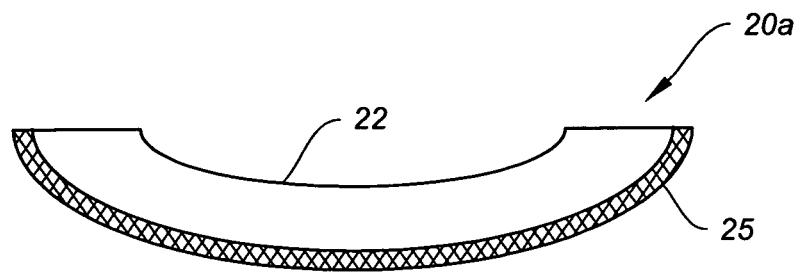
FIGS. 13A-13E are schematic representations, not to scale, of the flattening of a fruit wedge, as it moves through chunking blades (not shown)
Figure 13B:
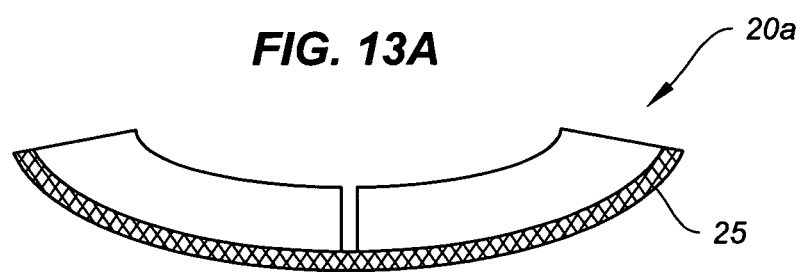
Figure 13C:
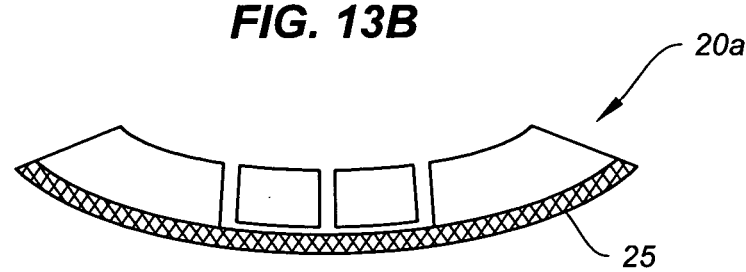
Figure 13D:
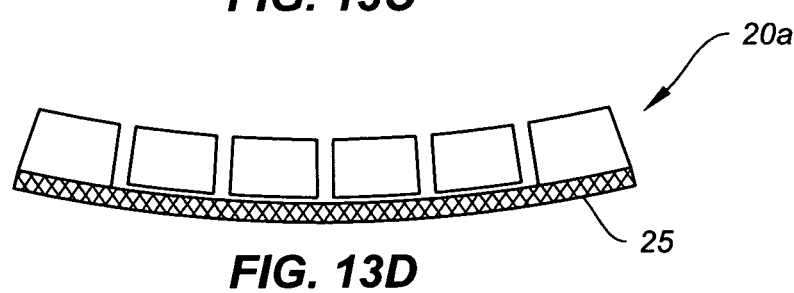
Figure 13E:
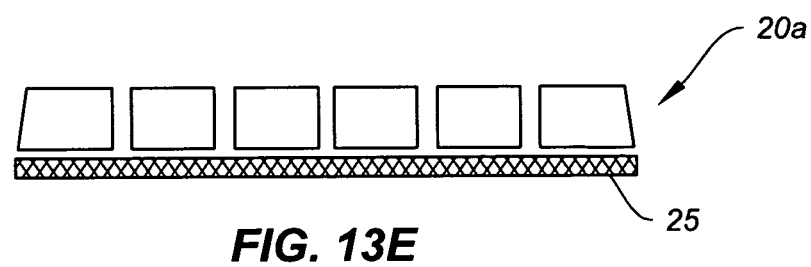
Figure 14A:
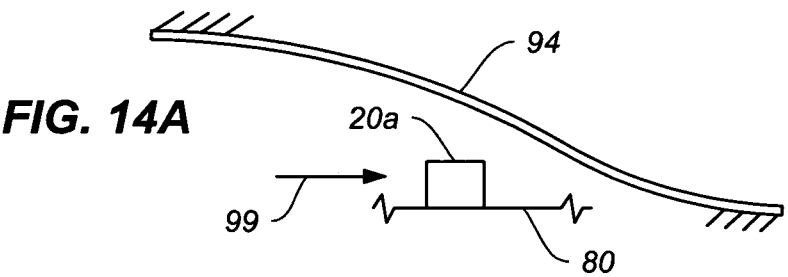
FIGS. 14A-14D are plan view schematic representations, not to scale, illustrating the inclined and elongated chunking blades as they cut through a wedge as the wedge is conveyed through the blades.
Figure 14B:
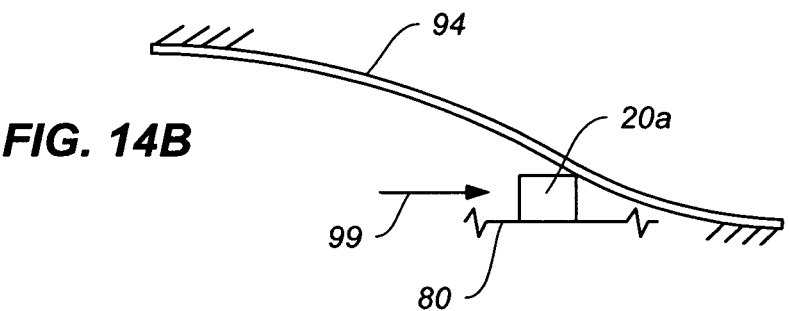
Figure 14C:
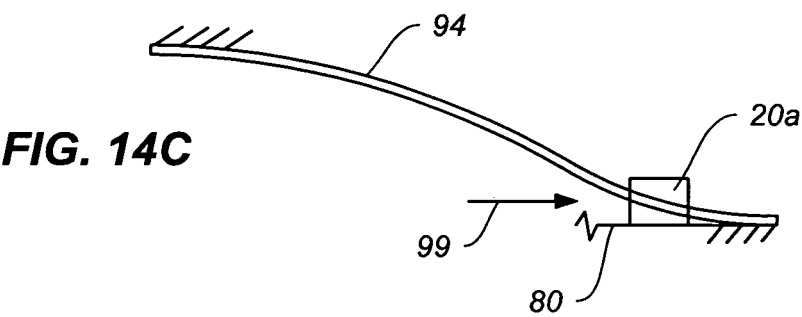
Figure 14D:
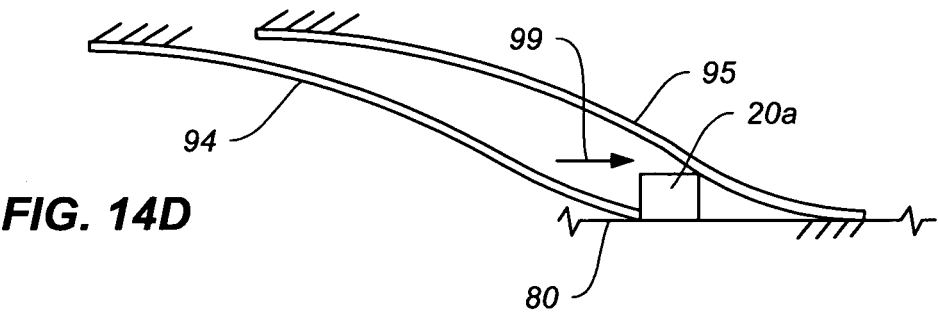

FIGS. 13A-13E illustrate how a single wedge is flattened by the sequential cutting by the transverse chunking blades (not shown). These figures are schematic, not to scale and are intended to show the sequence of operation of the chunking blades and the peeling blade. The blades are not shown. The wedge 20a moves in a direction outwardly from the drawing toward the viewer. FIG. 13A shows the wedge 20a before it contacts the first transverse blade 94. FIG. 13B shows wedge 20a after it is pierced by transverse blade 94 but before it contacts peel removal blade or knife 100. The peel 25 is separated from the longitudinal center 22 of wedge 20a first by blade 100, as shown in FIG. 13C. Wedge 20a is steadily flattened as the wedge is conveyed through chunking blades that lie further away from the center 22 of wedge 20a. By flattening each wedge in this fashion, a flat peeling blade can be utilized. FIGS. 13D and 13E show how the peel 25 is sequentially separated by knife 100 from the flesh of wedge 20a as wedge 20a moves through the chunking blades.

FIGS. 14A-14D are plan view schematic illustrations, not to scale, which illustrate how a wedge is conveyed into and through center chunking blade 94, and then through chunking blade 95. Blade 95 is not shown in FIGS. 14A-14C for clarity. Blades 94 and 95 are stationary, elongated and inclined toward conveyor 80 in the direction of travel 99 of wedge 20a. The inclination and overall length of blades 94 and 95 tend to prevent wedge 20a from sliding or rotating by urging wedge 20*a* toward the bed of conveyor 80. The inclined blades 94, 95 minimize the force required to convey wedge 20*a* through them.

FIGS. 15A-15C are described above after the description of FIG. 7.

The present invention provides a "smart" fruit chunking machine which automatically adjusts the movable blades used for coring and seed ceiling for each item of fruit all for the purpose of maximizing yield and efficiency based on feedback from servo motor, as described.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments suited to the particular use contemplated.

The invention claimed is:

1. Apparatus for chunking unpeeled pineapples or melons automatically and at high speed, comprising:
    means for slicing pineapples or melons into unpeeled wedges, each wedge have two upturned ends, a center section and a longitudinal axis extending between said upturned ends,
    means for singulating and conveying said unpeeled wedges in a direction perpendicular to said longitudinal axis,
    means for first chunking and thereafter peeling said wedges, said means including a plurality of stationary chunking blades that are staggered along the direction of motion of said conveying means to make transverse cuts on each wedge without severing said peel, said transverse cuts being made sequentially from said center section toward each upturned end of each wedge to flatten each wedge as said transverse cuts are made, thereby forming chunks having maximized rectangular prism shape while still attached to said peel, and
    a stationary peeling blade that severs the peel from each of said chunks.

2. The apparatus of claim 1 wherein said means for peeling each wedge is shaped and positioned to sever the peel of each wedge simultaneously as each wedge is flattened by said chunking means.

3. The apparatus of claim 1 wherein each of said chunking blades is elongated and inclined toward said conveying means along the direction of travel of said conveyor means.

4. The apparatus of claim 1 further comprising means for simultaneously forming spears along with chunks.

5. The apparatus of claim 1 further comprising a seed cell removal knife having
    a support tube
    an expandable, curved blade carried by said support tube
    means for moving said expandable blade between a retracted position and an expanded position,
    means for automatically determining the size of each pineapple or melon and the location of its seed cell, and
    controller means for using the said location of each seed cell to position and expand said seed cell removal knife, whereby said seed cell is severed with minimum waste.

* * * * *